April 14, 1925.

C. A. DENE 1,533,975

GAUGE OR LEVELING DEVICE FOR ELECTRIC OR OTHER DRILLS

Filed June 16, 1923

WITNESSES

INVENTOR
CHARLES A. DENE
BY
ATTORNEYS

Patented Apr. 14, 1925.

1,533,975

UNITED STATES PATENT OFFICE.

CHARLES ALBERT DENE, OF LAMBERTVILLE, NEW JERSEY.

GAUGE OR LEVELING DEVICE FOR ELECTRIC OR OTHER DRILLS.

Application filed June 16, 1923. Serial No. 645,826.

*To all whom it may concern:*

Be it known that I, CHARLES A. DENE, a citizen of the United States, and a resident of Lambertville, in the county of Hunter-don and State of New Jersey, have invented a new and Improved Gauge or Leveling Device for Electric or Other Drills, of which the following is a full, clear, and exact specification.
The present invention relates to new and useful improvements in boring tools, and it pertains more particularly to an attachment whereby the tool may be properly positioned during the boring operation.
It is one of the objects of the invention to provide an attachment for drills by means of which the drill may be positioned in a true vertical plane in order that a hole may be drilled straight in a piece of work.
It is a further object of the invention to provide an attachment for drills by means of which holes may be drilled at predetermined angles and the drill maintained at such angle throughout the drilling operation.
It is a still further object of the invention to provide an attachment by means of which a plurality of single holes may be drilled uniformly at the same angle.

With the above and other objects in view, reference is had to the accompanying drawings, in which Figure 1 is a view in elevation of an electric drill constructed in accordance with the present invention;
Fig. 2 is a view in elevation taken at right angles to Fig. 1;

Figure 1:
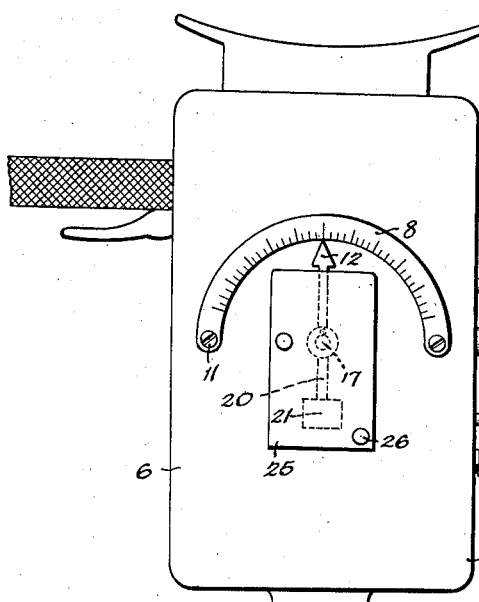
Figure 2:
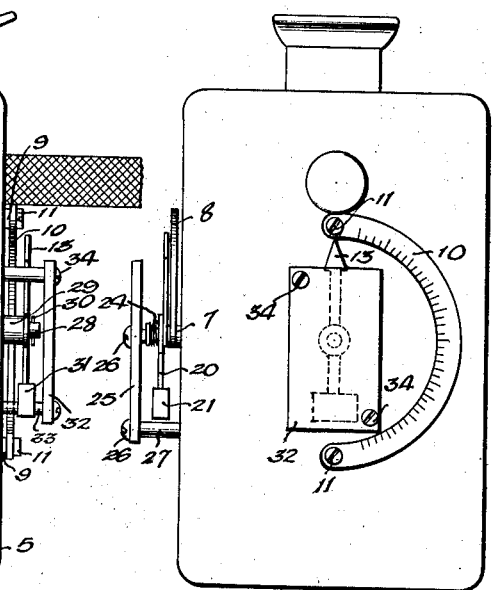
Figure 4:
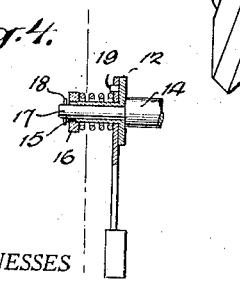
Fig. 4 is a detail sectional view taken at right angles to Fig. 3.
Referring more particularly to the drawings the reference character 5 designates a drill, and while the same is shown as a drill of the electric type, it is obvious that the invention may be applied to any type of boring tool, and it is therefore not limited to electric drills.

The drill shown is formed with a housing 6, provided with lugs or bosses 7 on one of its side faces, and mounted on said lugs or bosses 7 in a horizontal plane, is an arcuate scale 8. On the face right-angularly disposed with respect to the face upon which the bosses 7 are formed are bosses 9, which serve to support an arcuate scale 10, which occupies a vertical position with respect to the drill. I each of the aforementioned cases the scales 8 and 10 are secured to their respective bosses by means of screws or the like, 11.

Figure 3:
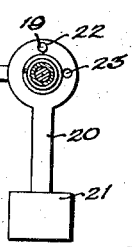
Fig. 3 is a detail sectional view.

Adapted to coact with the scale 8 is a pointer 12, and adapted to coact with the scale 10 is a pointer 13. This pointer 12 is mounted on a stud 14, or the like, carried by the drill housing, and said stud has a forwardly extending sleeve 15, upon the end of which is mounted a nut 16. The sleeve is mounted on a reduced portion 17 of the stud 14, and to prevent its accidental displacement from the reduced portion, a pin 18 is employed. The pointer 12 is provided with a projecting pin 19, the purpose of which will be hereinafter described. Mounted upon the sleeve 15 of the pointer 12, is an arm 20, and said arm is provided with a balance weight 21. This arm 20 is provided with two openings 22 and 23, either of which is adapted to receive the pin 19 of the pointer 12, in order that the weighted arm 20 may be positioned either parallel with the pointer 12, as shown in Fig. 1, or at right angles thereto, as shown in Fig. 3. To maintain the weighted arm 20 in position against the pointer 12, a spring 24 is mounted on the sleeve 15, which sleeve causes endwise tension between the nut 16 and the weighted arm 20. After this pointer and the weighted arm has been mounted on the reduced portion 17 of the stud 14, a guard plate 25 is positioned thereover and secured in place by means of screws 26 engaging lugs 27, or the like.

The pointer 13 is mounted on the reduced end 28 of a stud 29 and the same is retained in position upon said reduced end 28 by means of a pin 30, or the like. This pointer 13 is provided with a weighted portion 31, whereby the pointer is always maintained in a true vertical plane. After the pointer 13 has been positioned, a guard plate 32 is positioned upon lugs 33 and retained thereon by means of screws 34, which guard plate 32 serves to protect the pointer 13 and its pivotal point 29.

The device operates in the following manner:

When it is desired to drill a hole at right angles to the surface, the drill is positioned in such a manner that the pointer 12 will coincide with the center of the arcuate scale 8 and the pointer 13 will coincide with the upper end of the arcuate scale 10. If now the hole is drilled with the drill maintained in this position, the hole when finished will occupy a plane at right angles to the surface of the material through which the hole was drilled.

If it is desired to drill a hole at a predetermined angle, the drill is positioned so that the pointers will coincide with the proper calibrations on their respective scales, and if the drill is maintained in this position the hole will be drilled in the plane of such predetermined angle.

It is to be understood that in the previously described operation of the device, the weighted arm 20 occupies a position parallel with or in longitudinal alinement with the pointer 12. When it is desired to use the drill in a horizontal plane, the weighted arm 20 is positioned at right angles to its pointer 12, and this is done by disengaging the opening 23 in the arm 20 with the pin 19 carried by the pointer 12, and engaging the opening 22 with the pin 19. With this weighted arm so adjusted with respect to its pointer 12 and the drill used in a horizontal plane, the weighted arm 20 will depend and a true horizontal position of the drill may thus be had by properly positioning the pointer 12 with respect to its scale 8.

From the foregoing it is apparent that the present invention provides a gauge for drills by means of which the drill may be positioned and maintained in position at right angles to the surface upon which the drill is operating, or such drill may be positioned and maintained in a position in the plane of a predetermined angle with respect to the surface upon which the drill is operating.

What is claimed is:

1. A level indicator, comprising a weighted arm, a pointer means for pivotally mounting said weighted arm and pointer, and means for rigidly connecting said pointer to said arm, said means comprising a pin carried by the pointer adapted to be received in one of a plurality of openings formed in the weighted arm, and means for maintaining said pin in its opening.

2. A level indicator, comprising a weighted arm, a pointer means for pivotally mounting said weighted arm and pointer, and means for rigidly connecting said pointer to said arm, said means comprising a pin carried by the pointer adapted to be received in one of a plurality of openings formed in the weighted arm, and means for maintaining said pin in its opening, said means comprising a coil spring surrounding the pivotal point of the pivoted arm and having engagement therewith.

CHARLES ALBERT DENE.